United States Patent [19]
Simpson

[11] Patent Number: 5,206,736
[45] Date of Patent: Apr. 27, 1993

[54] FONT STORAGE MANAGEMENT AND CONTROL

[75] Inventor: Russell W. Simpson, Rochester, N.Y.

[73] Assignee: Xerox Corporation, Stamford, Conn.

[21] Appl. No.: 590,096

[22] Filed: Sep. 28, 1990

[51] Int. Cl.$^5$ .......................... H04N 1/23; B41J 5/46; B41J 5/48; G06F 3/12; G06F 15/66

[52] U.S. Cl. ..................... 358/296; 395/110; 400/61; 400/70

[58] Field of Search ............... 358/296, 467; 340/735, 340/790; 400/61, 70, 692, 62, 69; 395/110

[56] References Cited

U.S. PATENT DOCUMENTS

| | | | |
|---|---|---|---|
| 3,634,822 | 1/1972 | Chow | 340/146.3 |
| 3,964,591 | 6/1976 | Hill . | |
| 4,388,010 | 6/1983 | Mott et al. | 400/692 |
| 4,660,998 | 4/1987 | Tsuneki | 395/110 |
| 4,660,999 | 8/1987 | Tsuneki | 400/61 |
| 4,686,525 | 8/1987 | Nagata et al. | 340/790 |
| 4,715,006 | 12/1987 | Nagata | 395/110 |
| 4,745,560 | 5/1988 | Decker | 395/110 |
| 4,745,561 | 5/1988 | Hirosawa et al. | 364/523 |
| 4,763,281 | 8/1988 | Arakawa | 364/523 |
| 4,837,712 | 6/1989 | Shibamiya | 364/523 |
| 4,866,671 | 9/1989 | Yokoyama | 395/110 |
| 4,957,377 | 9/1990 | Takahashi | 400/61 |
| 5,051,925 | 9/1991 | Kadono | 395/110 |

*Primary Examiner*—Edward L. Coles, Sr.
*Assistant Examiner*—Scott A. Rogers
*Attorney, Agent, or Firm*—Mark Costello

[57] ABSTRACT

A font storage management and control arrangement which allows the addition of fonts to font storage and includes a font filter which provides a multilevel control of font information stored, to allow optimum use of limited font storage facilities. As font information is stored to font storage in printer controller, the font characteristics are examined for comparison with a predetermined list of font storage requirements. Font information is stored in accordance with user determination of whether particular font information is useful for the user.

8 Claims, 16 Drawing Sheets

| | | | |
|---|---|---|---|
| TYPEFACE FAMILY | XEROX MODERN | | |
| FONT | TYPEFACE | SIZE | ORIENTATION |
| | Bold Italic | 8 point | Landscape |
| CHARACTER SET | LATIN ALPHABET | | |
| CHARACTER CODE | 101 = upper case "A" | | |
| BITMAP | | | |

FONT STORAGE MANAGEMENT AND CONTROL

This invention relates generally to the control of font storage facilities in an electronic printer, and more particularly to an arrangement for optimizing selection of fonts to be stored in device memory.

BACKGROUND OF THE INVENTION

Large high speed electronic printers are now combinations of printing engines with extensive computational capability. As such printers enter the workplace, primarily in the print shop environment, the advantage of such devices over offset presses will be noted in the ease in which new jobs can be programmed. However, the new customers that will be served by such devices are extremely sensitive to print quality, in general, and specifically, to the appearance of each page of text. One feature of the job to which print shops are particularly sensitized is the use of specified fonts for a printing job.

Heretofore, it has been difficult to specify fonts for use by electronic printers, which usually only provide a limited number of typefaces (such as modern, classic, helvetica, terminal, etc.) in a limited number of font sizes (8-point, 10-point, 12-point, etc.), and font orientations (portrait, landscape, inverse portrait, inverse landscape) with other specified font characteristics (bold, italic, stricken). Font provisions for electronic printers usually offer a few resident fonts, and allow use of added fonts, commonly through cartridge addition which must be changed for each typeface or font, although font addition via a network connection is known. Generally fonts are very memory intensive, and in a small scale use, only a few fonts can be made available on a single printer. A single, very complete typeface which might provide bitmaps for several fonts of many sizes, each size in any of four orientations, each size and orientation also provided with specified characteristics, and which provides a large number of characters through each font, takes up a significant amount of electronic memory. Of course, some typefaces are more or less developed than others.

In large high speed electronic printers, significantly larger memories are available, allowing the storage of many fonts in a font memory. However, the memory of such devices is not infinite, the addition of new fonts requires operator intervention, and in general, a user would desire optimization of his use of font memory by providing the most used fonts in device storage, and have relatively little used fonts stored on external media for use in the device only as required.

The Xerox 6085 and 8010 workstations (products of the Xerox Corporation, Stamford, Conn.) offer users a variety of fonts, usually specified in relatively large groups, or even as complete typefaces, so that the creator of a document on the creator side of the document creation and printing process, may create documents for display on the WYSIWYG (what you see is what you get) display in the font selected. In these workstations, the files provided are in large, unbreakable blocks, so that, for example, a user generally has only the option of loading typefaces, although a particularly large typeface may be broken down into two subsets of fonts. No attempt is made, however, to determine whether the user may want all of the fonts in the particular file, because, for example, the user never uses 36 point or 6 point characters, or all of the characters in the fonts because, for example, the user never uses Cyrillic, German or Hebrew alphabet characters. Of course, the user will no doubt want access to such unusual (for him or her) fonts, on the occasion of a job requiring such fonts. Similar provision is made for fonts at printers such as the Xerox 8090 Print Server (Server Release 11.0) for control of various Xerox laser printer products and the Xerox 3700 Printer. Addition of fonts to these arrangements can be made through a network or through use of external storage media such as floppy disk.

SUMMARY OF THE INVENTION

In accordance with the invention, there is provided an arrangement for control of font storage in the font memory of a printer controller.

In accordance with one aspect of the invention, in a font storage arrangement which allows the addition of fonts to font storage, a font filter is provided which provides a multilevel control of font information stored, to allow optimum use of limited font storage facilities. As font information is stored to font storage in printer controller, the font characteristics are examined for comparison with a predetermined list of font storage requirement. Font information is stored in accordance with user determination of whether particular font information is useful for the user.

A font storage filter is generated at a user interface, to create a reference against which a font comparator operates as it receives font information from an external source. The font filter compares user-set filter parameters with font descriptions to determine whether a particular typeface, font or character received from the external source should be stored. The stored information is then available as an optimized font for use by the printer controller.

These and other aspects of the invention will become apparent from the following description used to illustrate a preferred embodiment of the invention in conjunction with the accompanying drawings in which.

Figure 1:
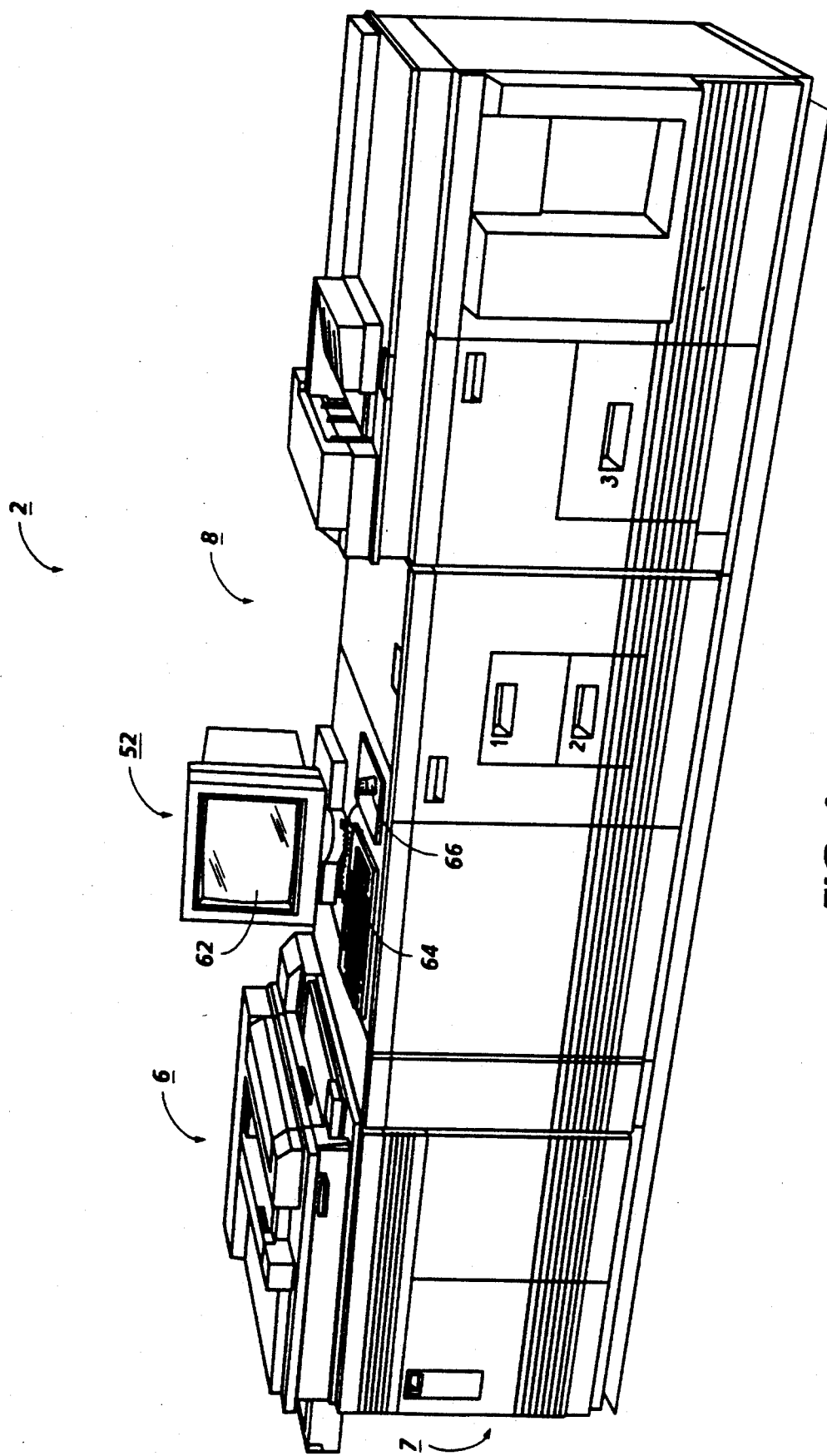
FIG. 1 is an isometric view of an illustrative xerographic reproduction machine incorporating the present invention.
Figure 5A:
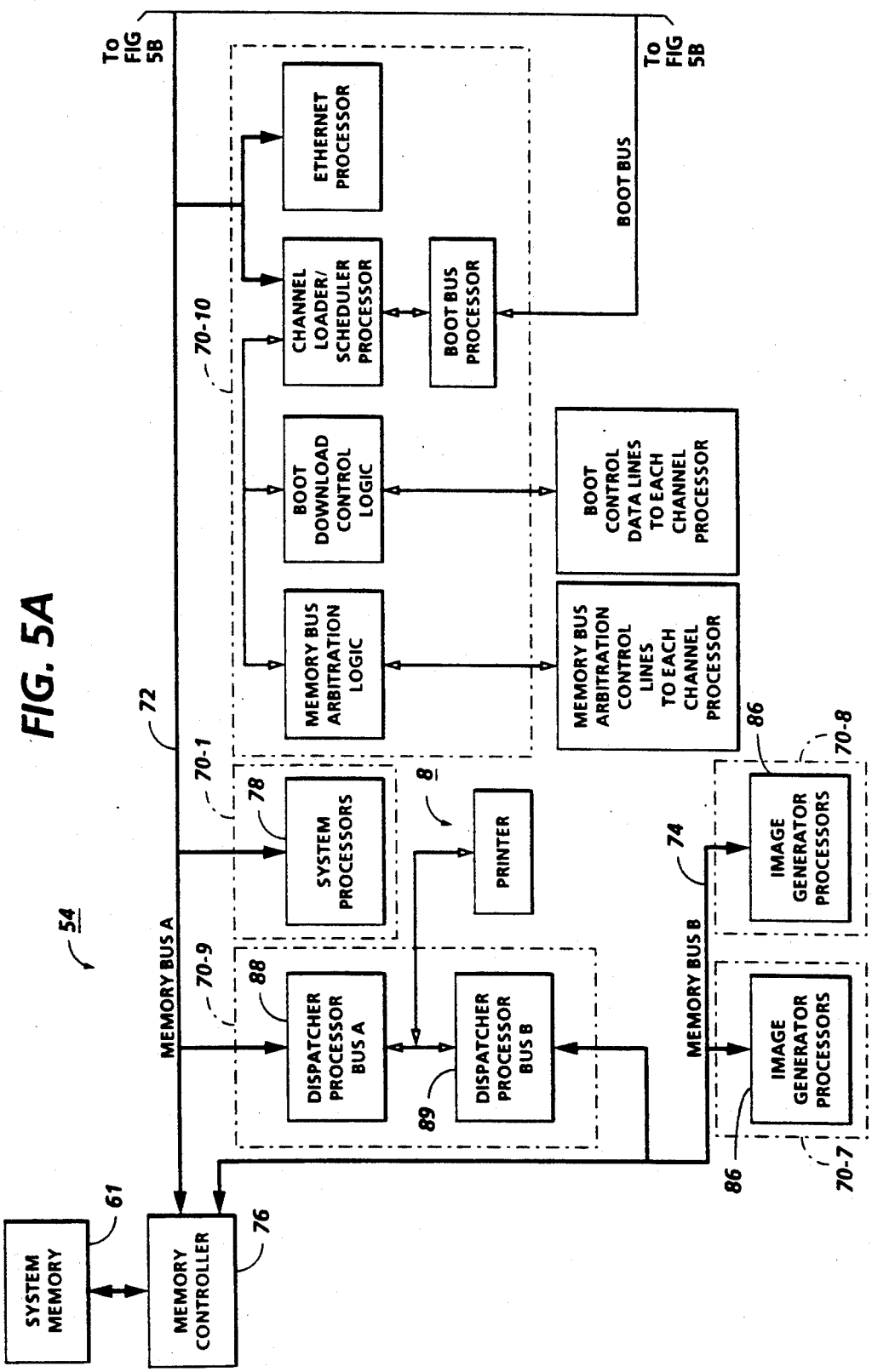
Figure 5B:
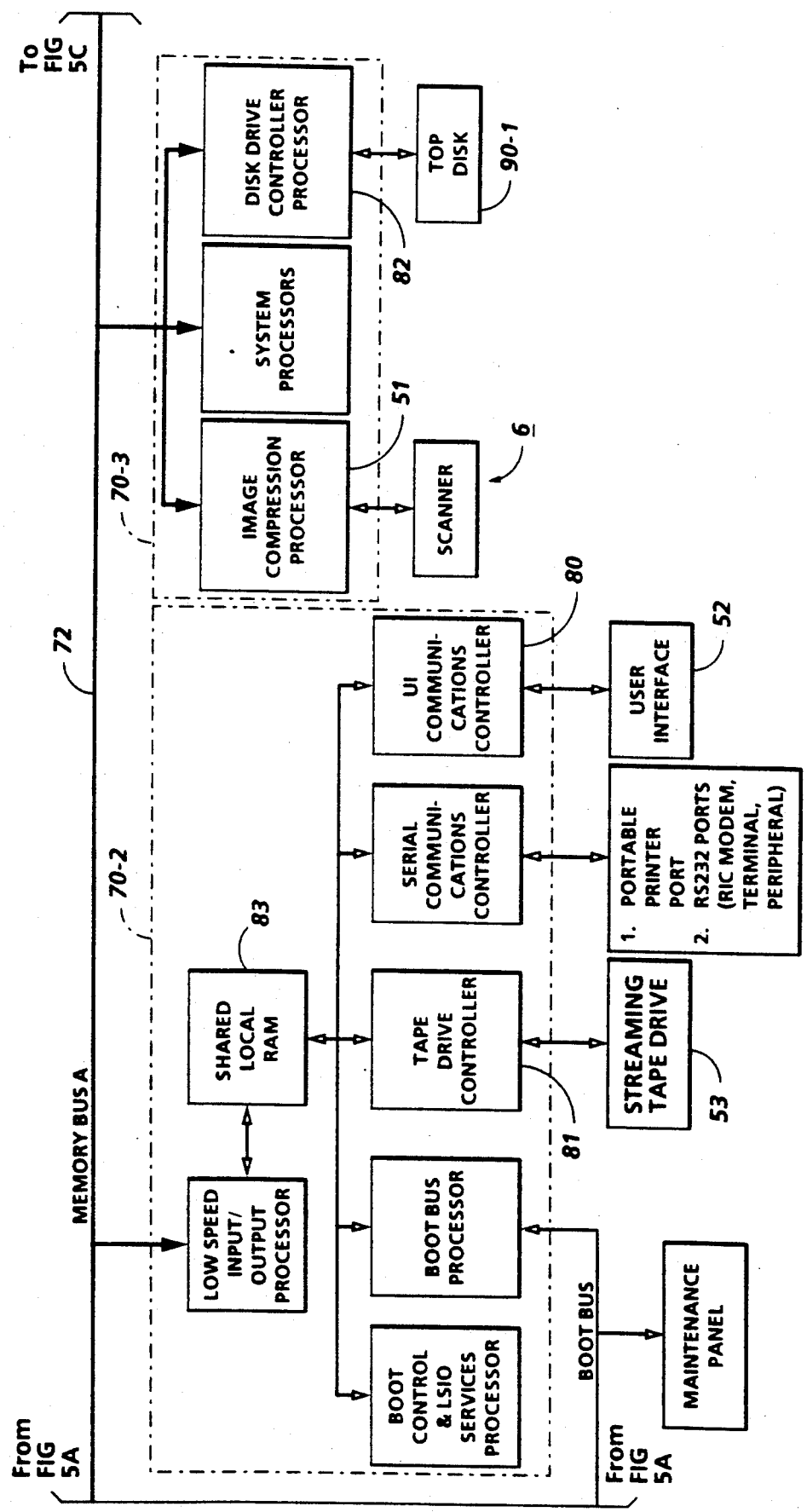
Figure 5C:
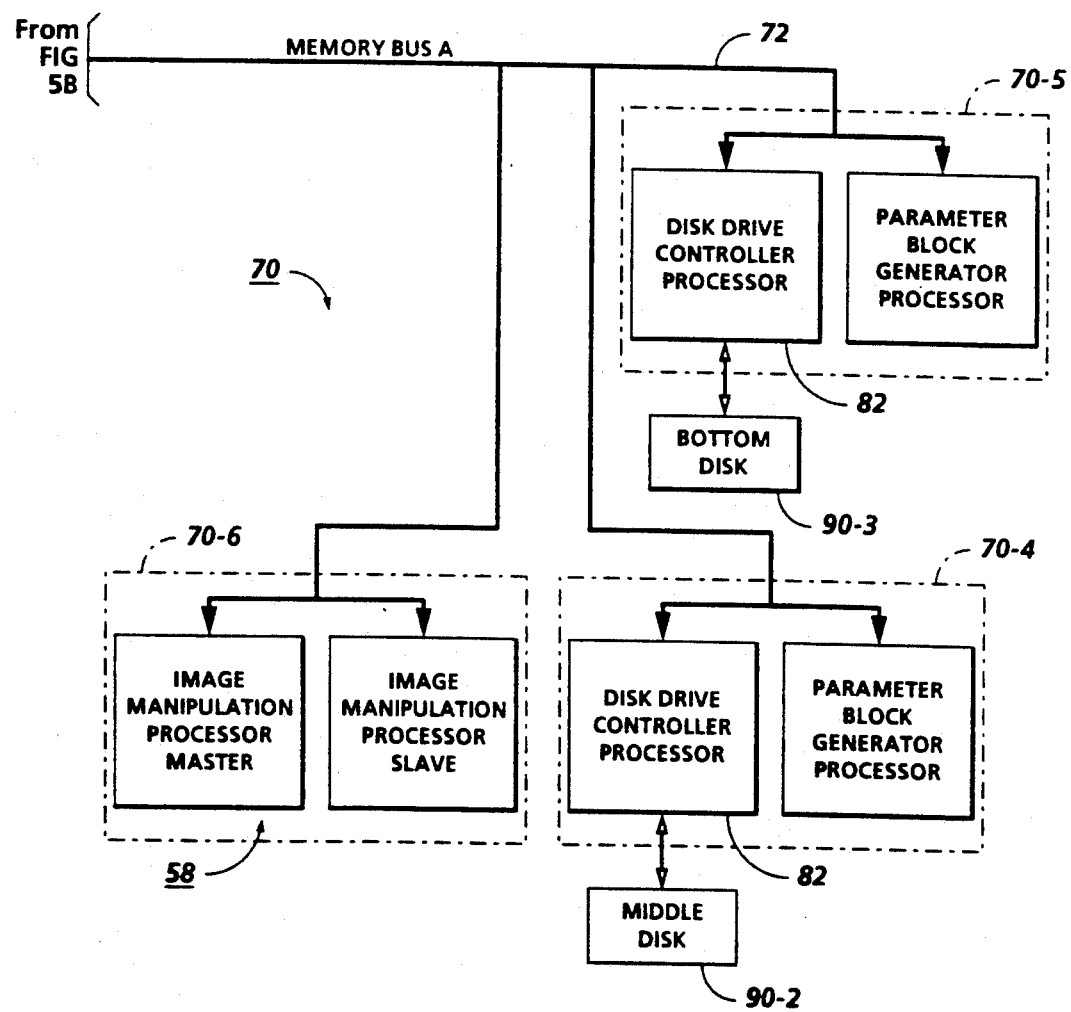
Figure 6:
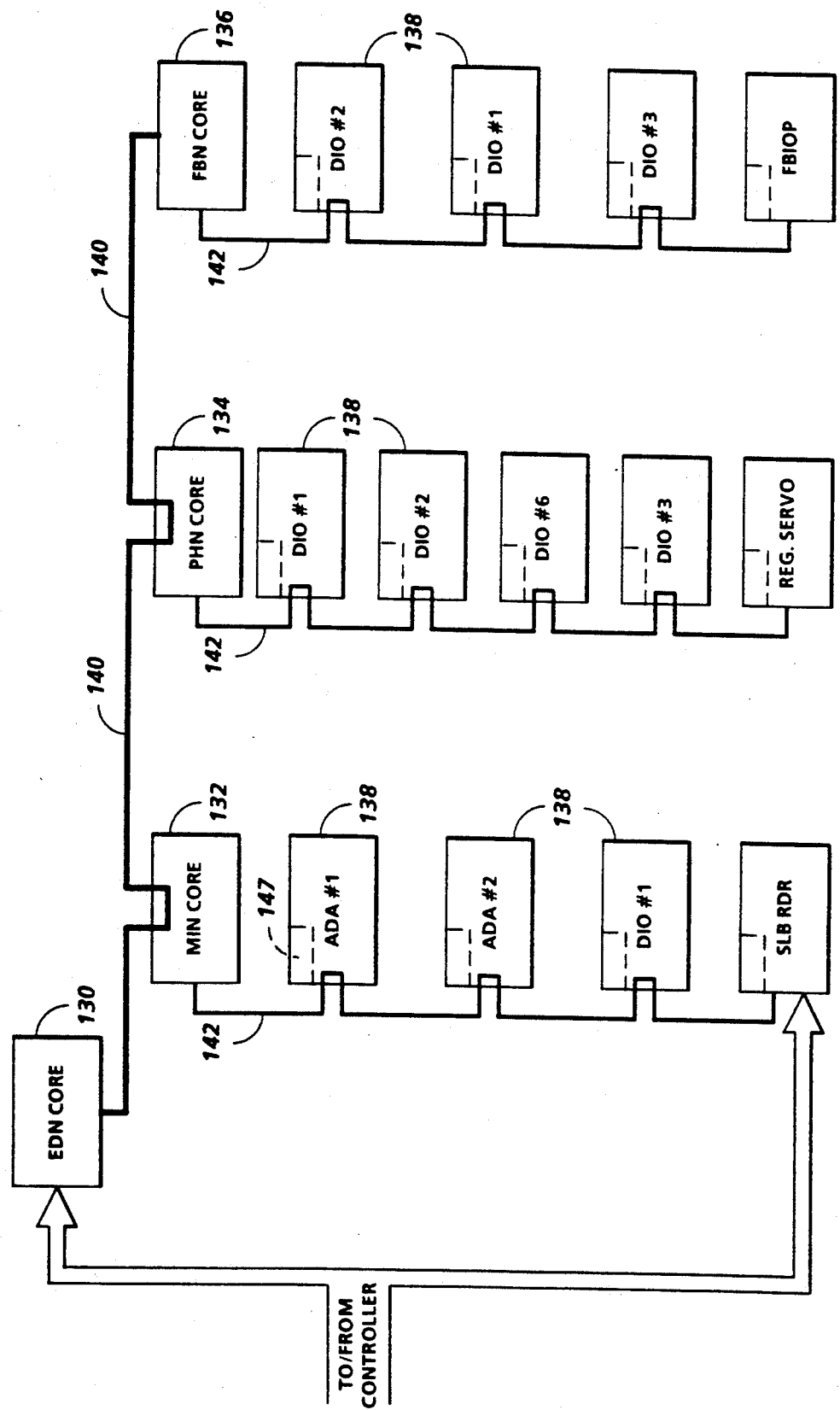
Figure 7:
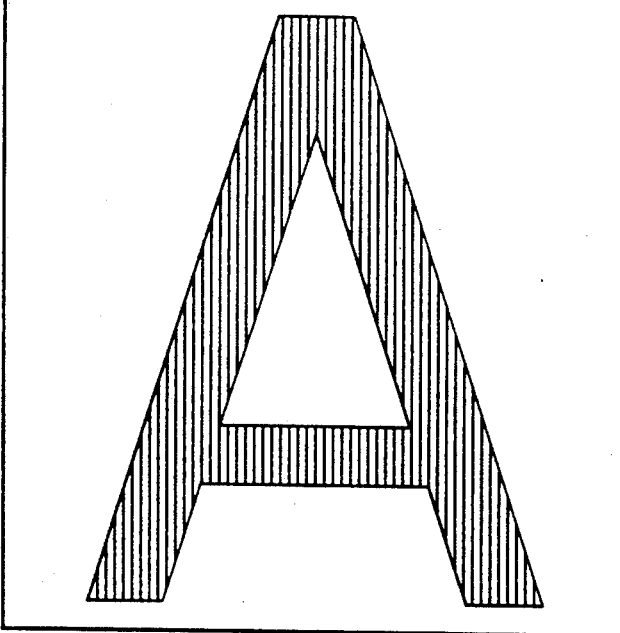
Figure 8A:
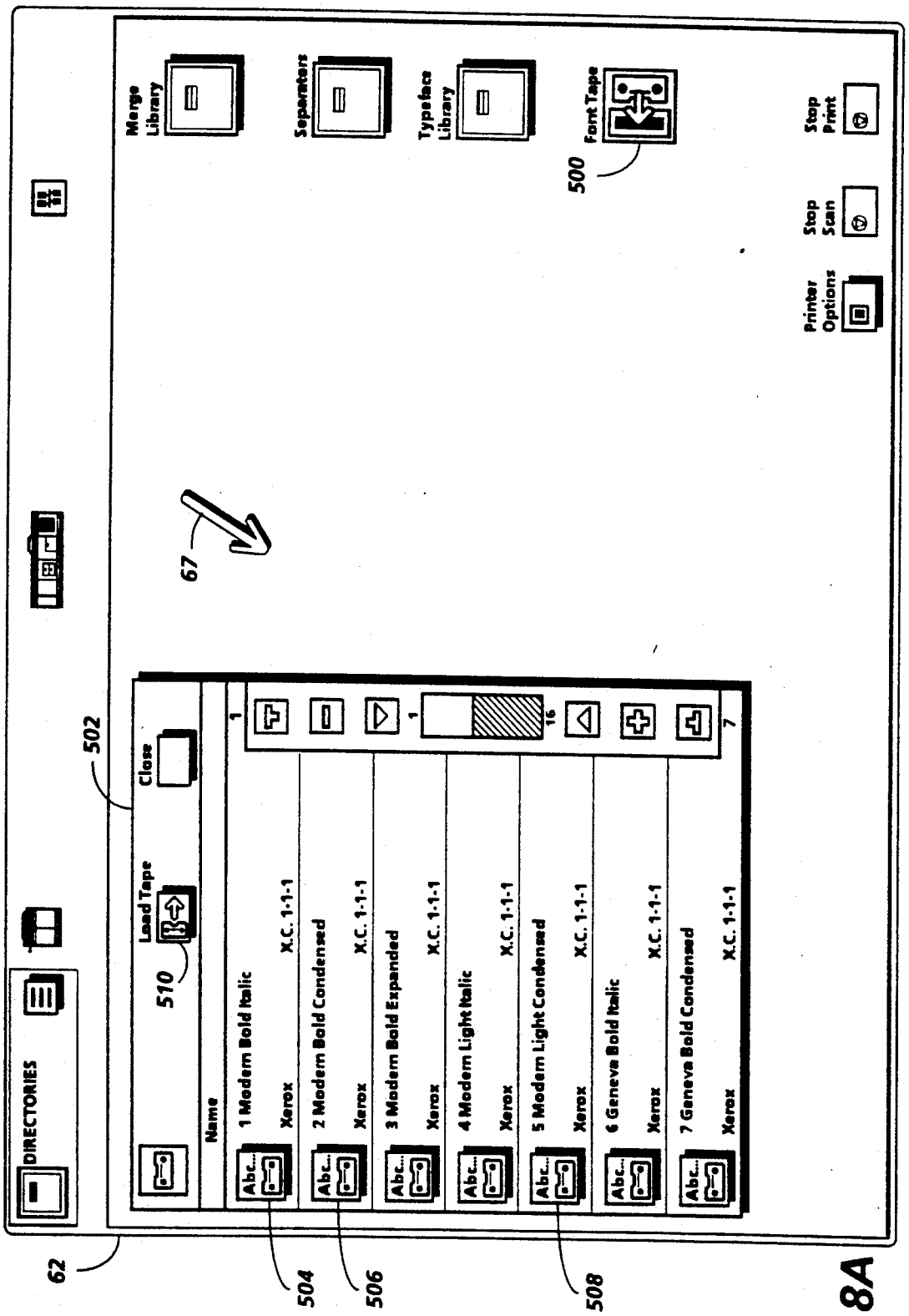
Figure 8B:
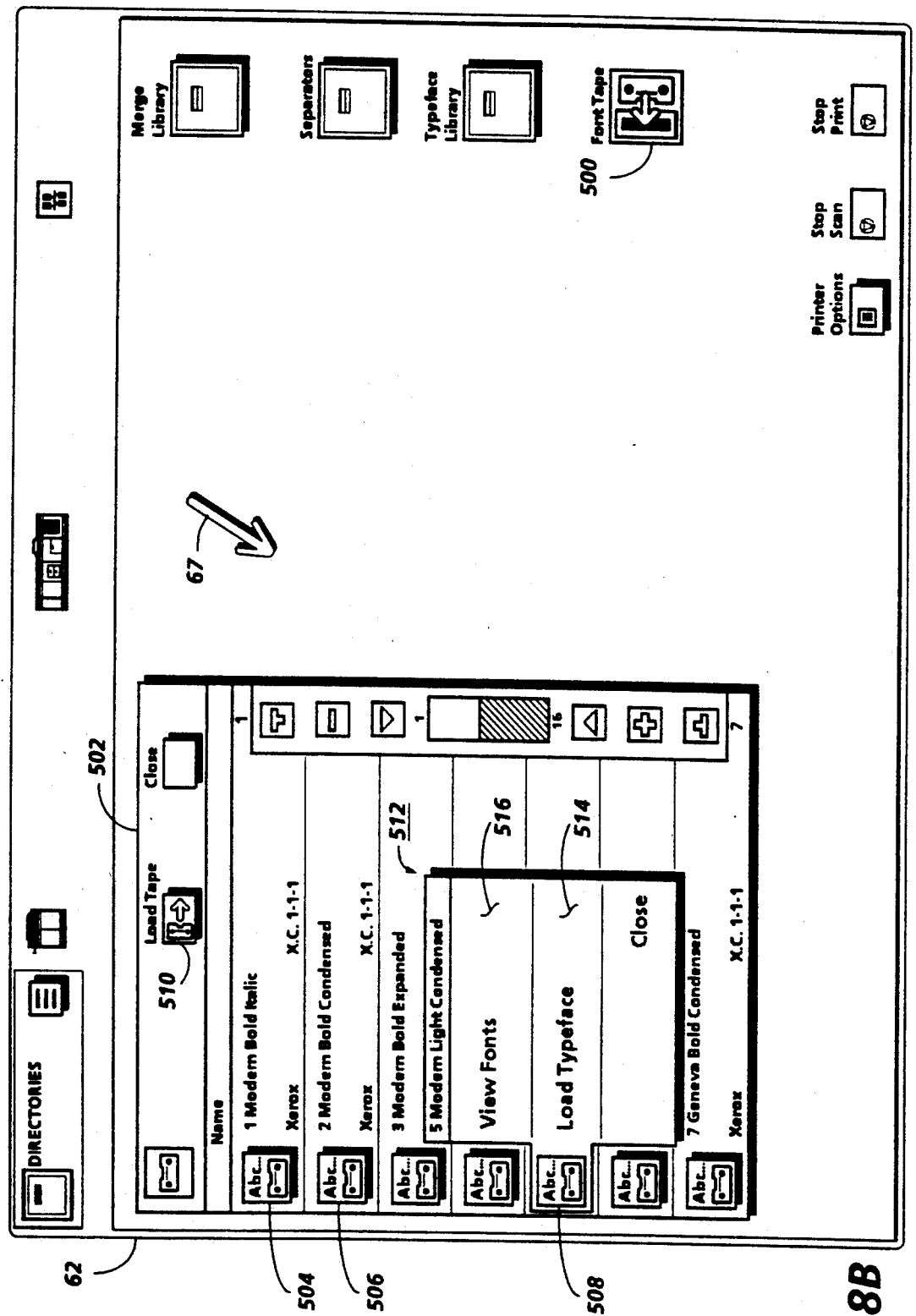
Figure 8C:
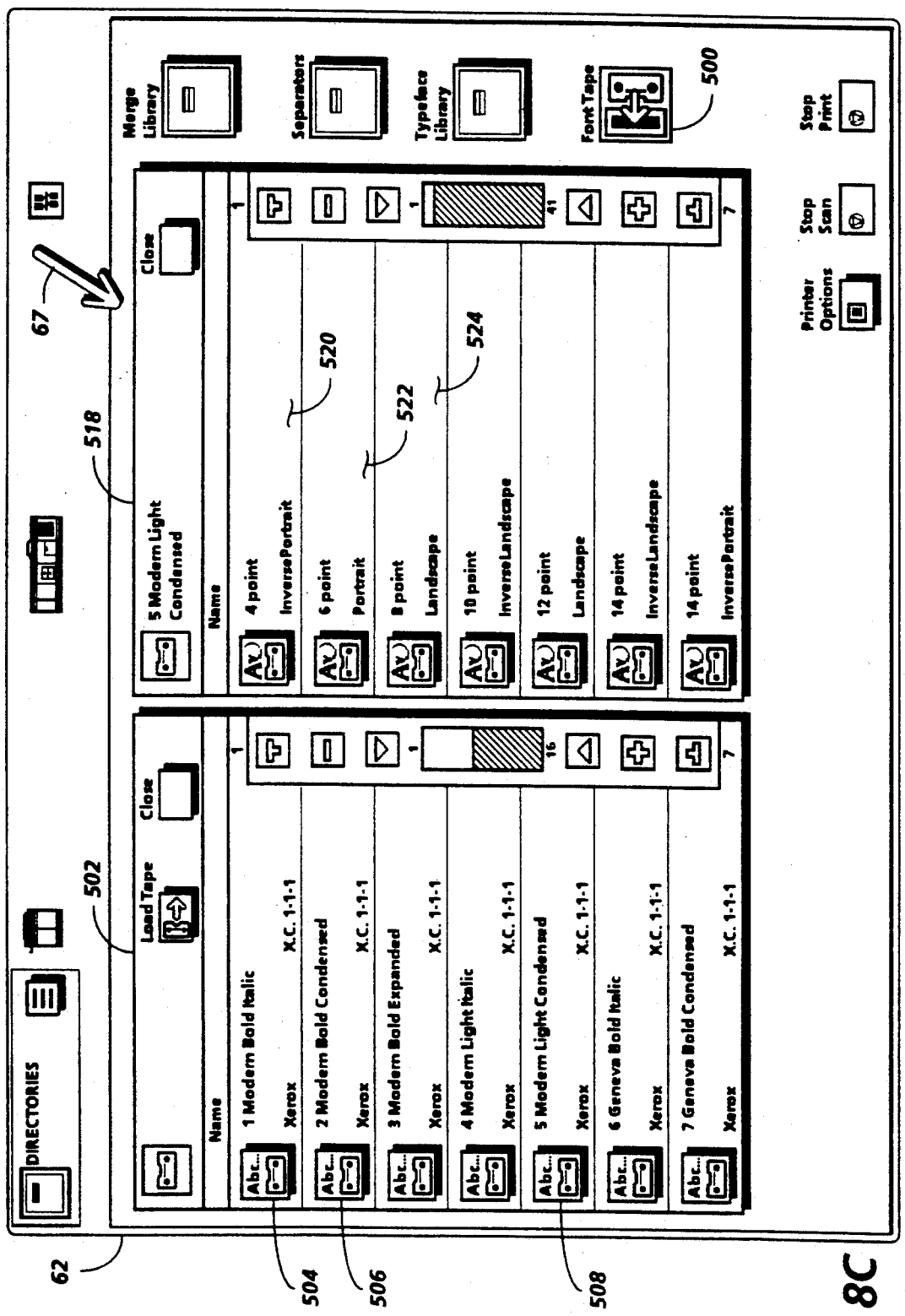
Figure 8D:
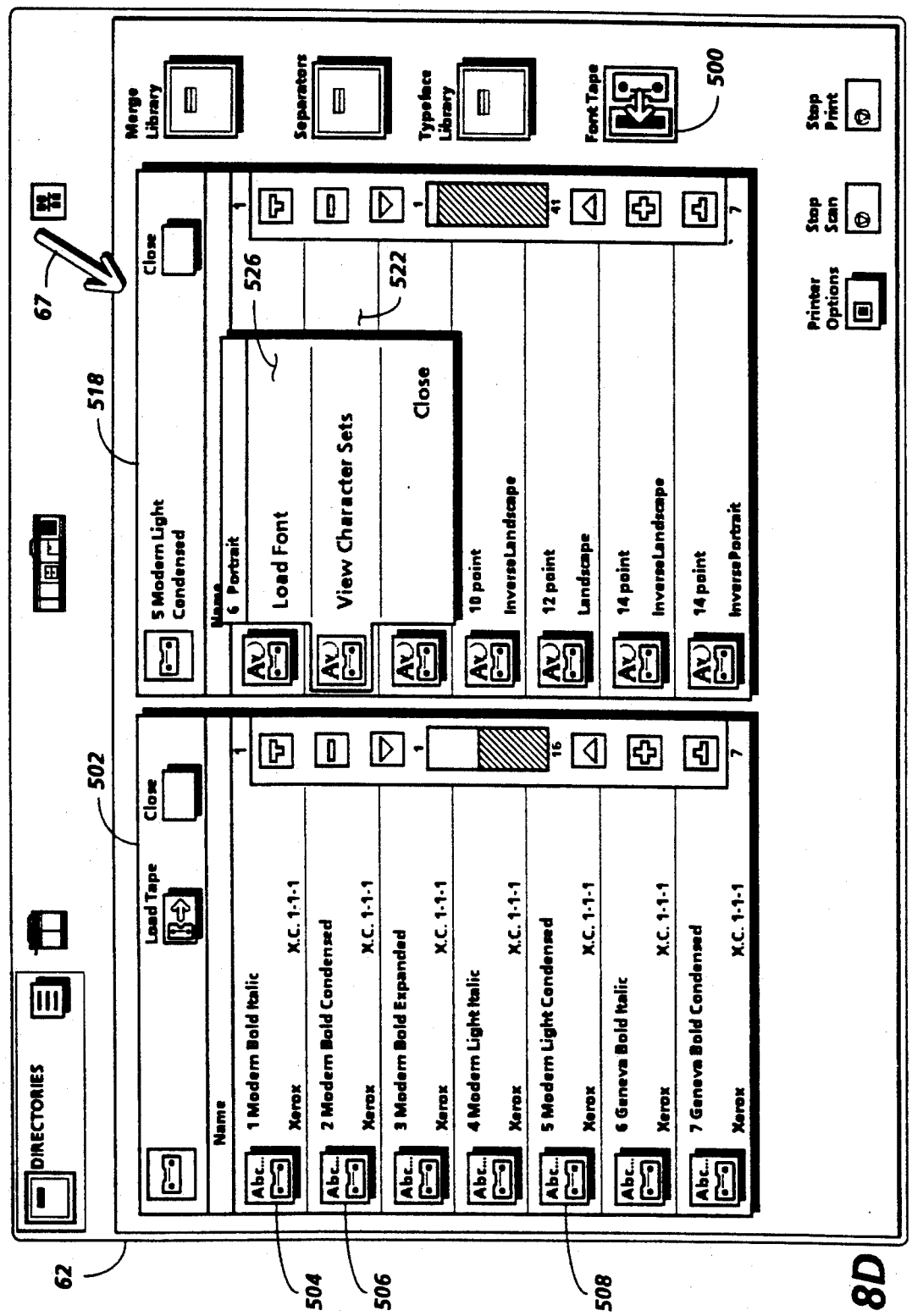
Figure 8E:
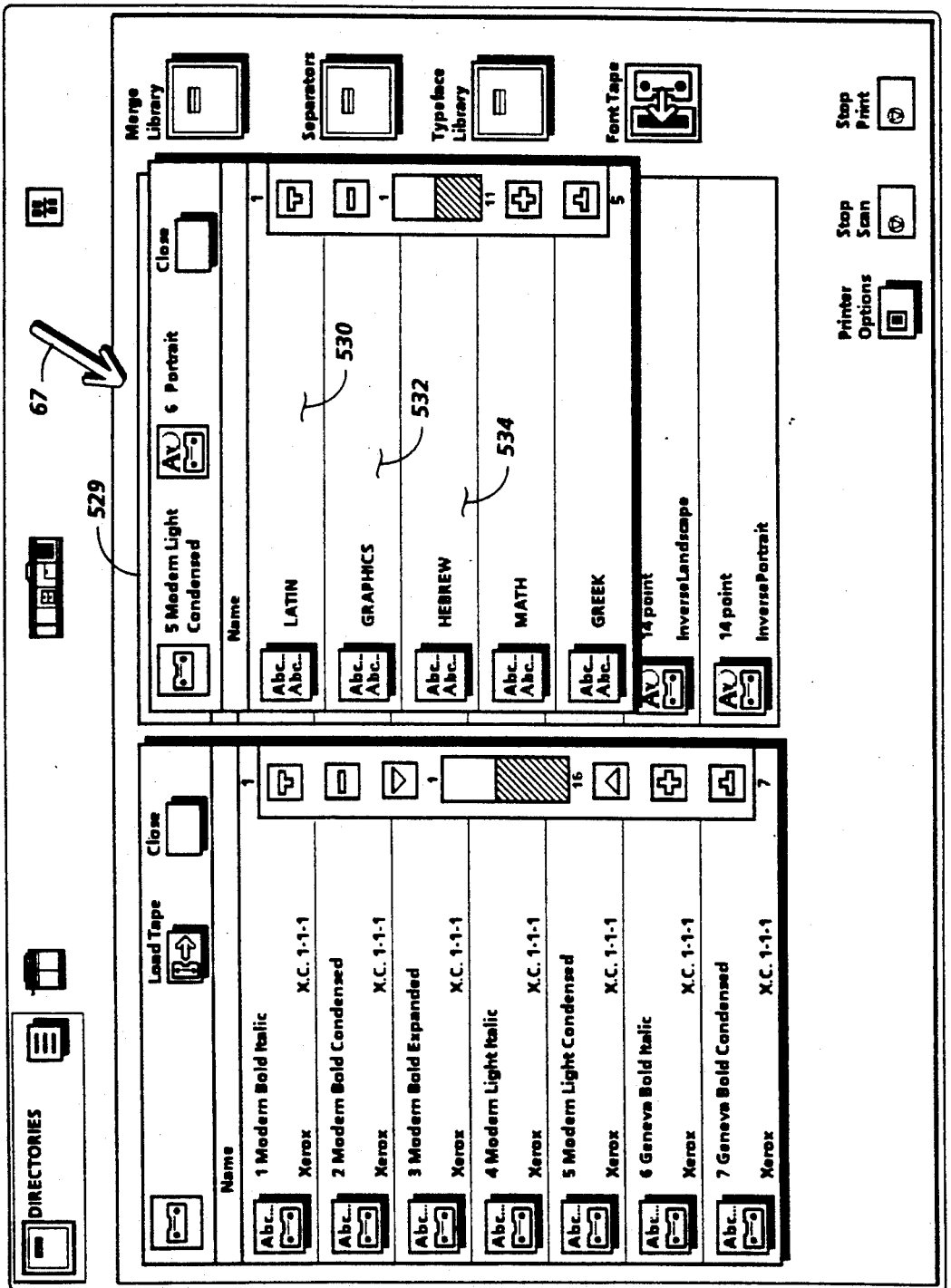
Figure 8F:
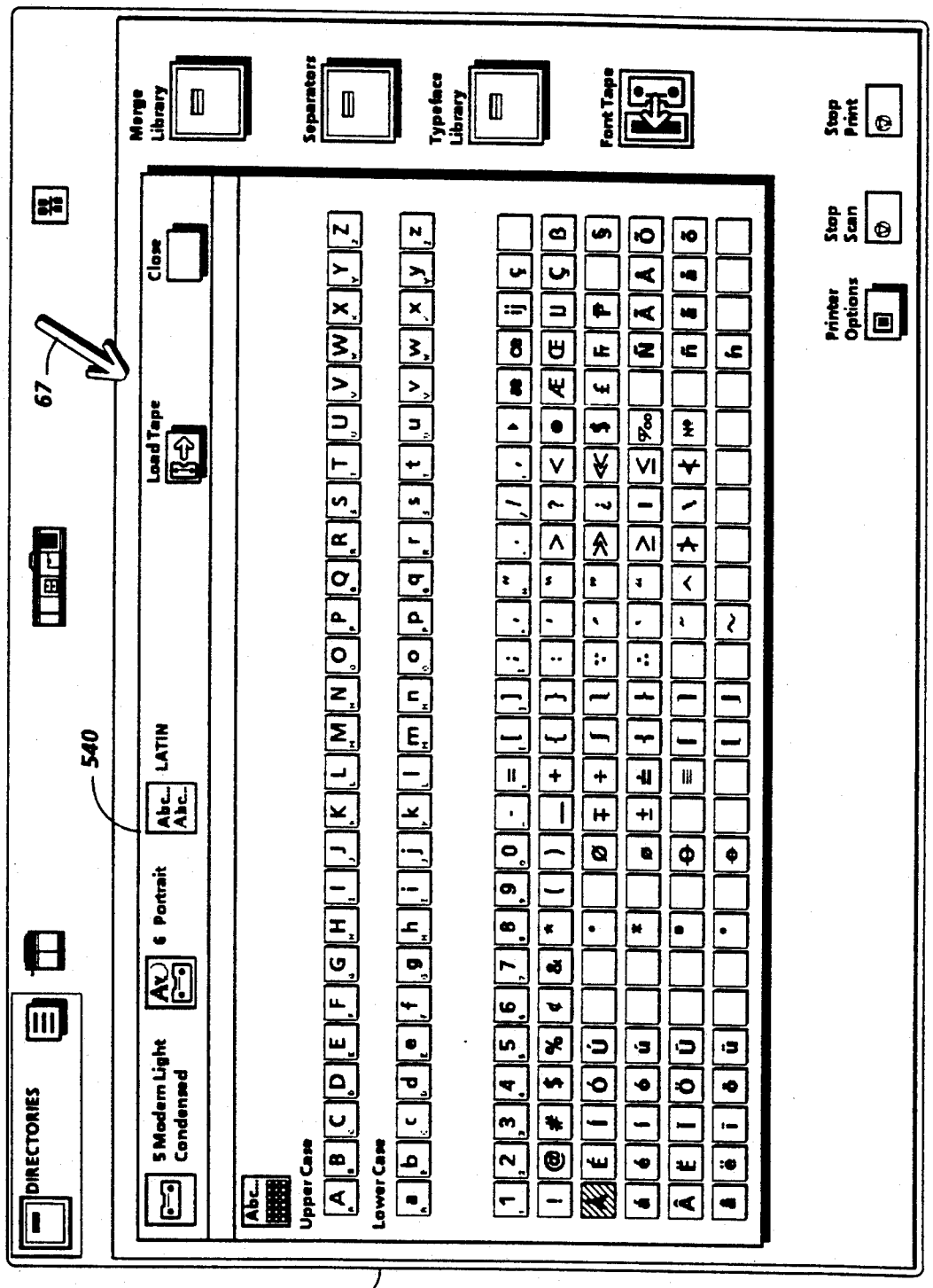
Figure 9:
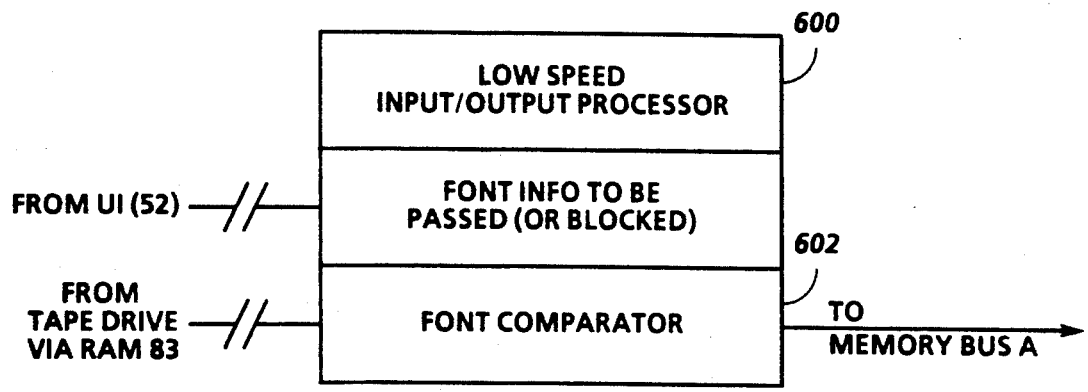

FIGS. 5A, 5B, and 5C comprise a schematic block diagram showing the major parts of the control section for the printing system shown in FIG. 1;

FIG. 6 is a block diagram of the Operating System, together with Printed Wiring Boards and shared line connections for the printing system shown in FIG. 1;

FIG. 7 shows one possible font information format, in which a character of a font in a typeface may be available;

FIGS. 8A–8F show a series of font memory management user interface screens, useful for control of font storage; and FIG. 9 shows a block diagram of the font filter arrangement.

Figure 2:
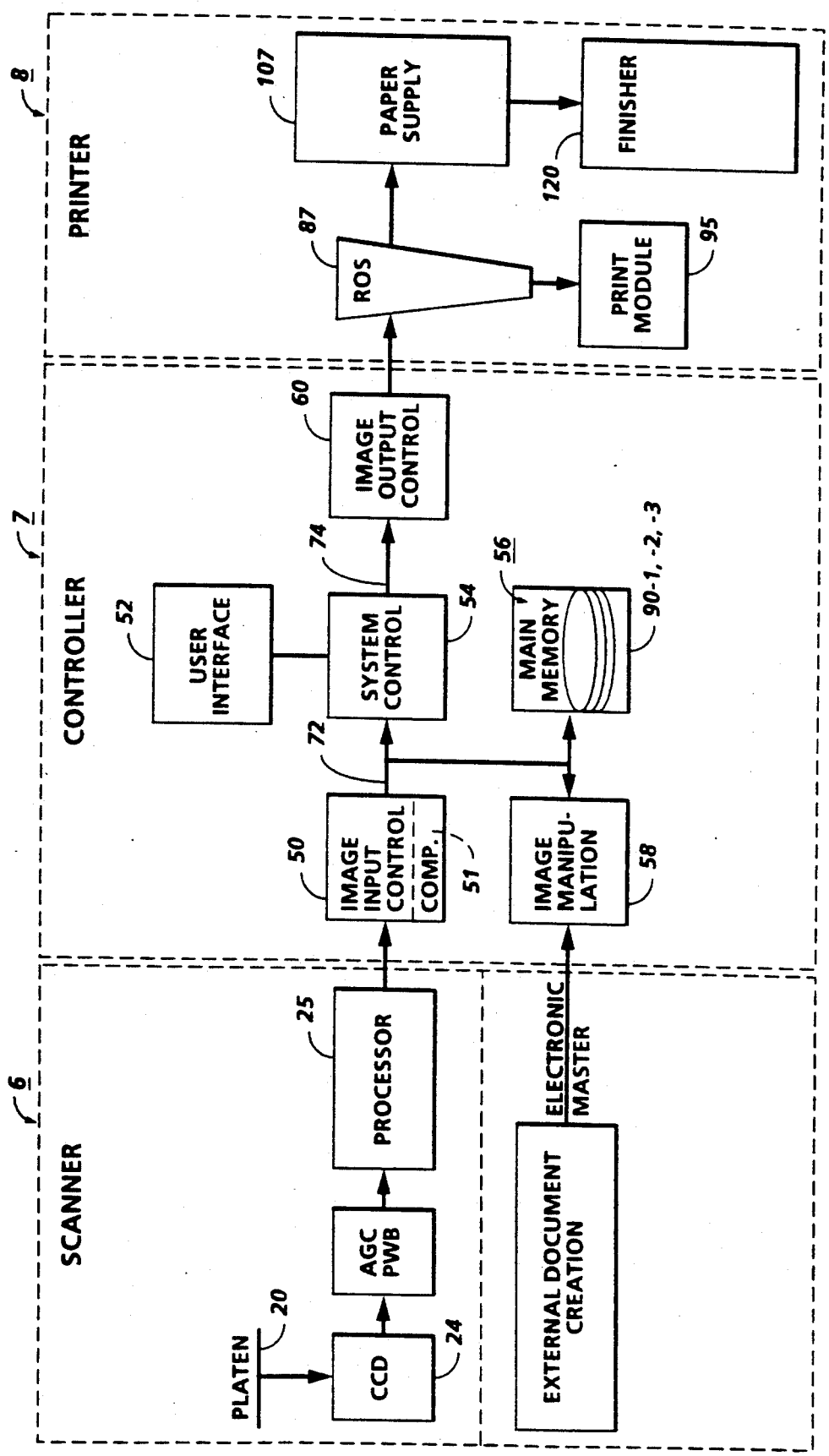
FIG. 2 is a block diagram depicting the major elements of the printing system shown in FIG. 1.

With reference to the drawings, where the showings are for the purpose of illustrating an embodiment of the invention and not for the purpose of limiting same, at FIGS. 1 and 2, there is shown an exemplary laser based printing system 2 for processing print jobs in accordance with the teachings of the present invention. Printing system 2, for purposes of explanation, is divided into a scanner section 6, controller section 7, and printer section 8. While a specific printing system is shown and described, the present invention may be used with other types of printing systems such as ink jet, ionographic, etc.

Figure 3:
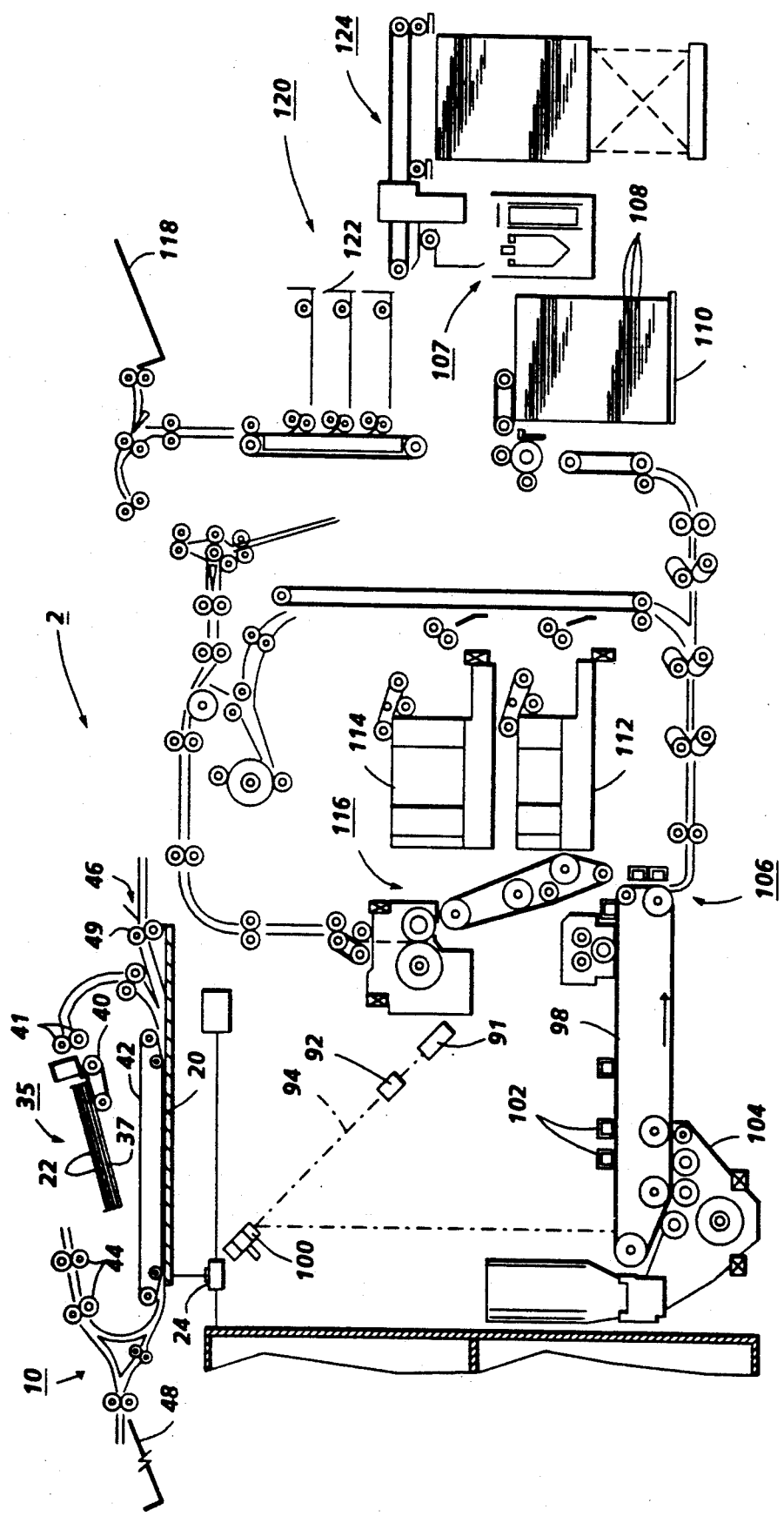
FIG. 3 is a plan view illustrating the principal mechanical components of the printing system shown in FIG. 1.
Figure 4:
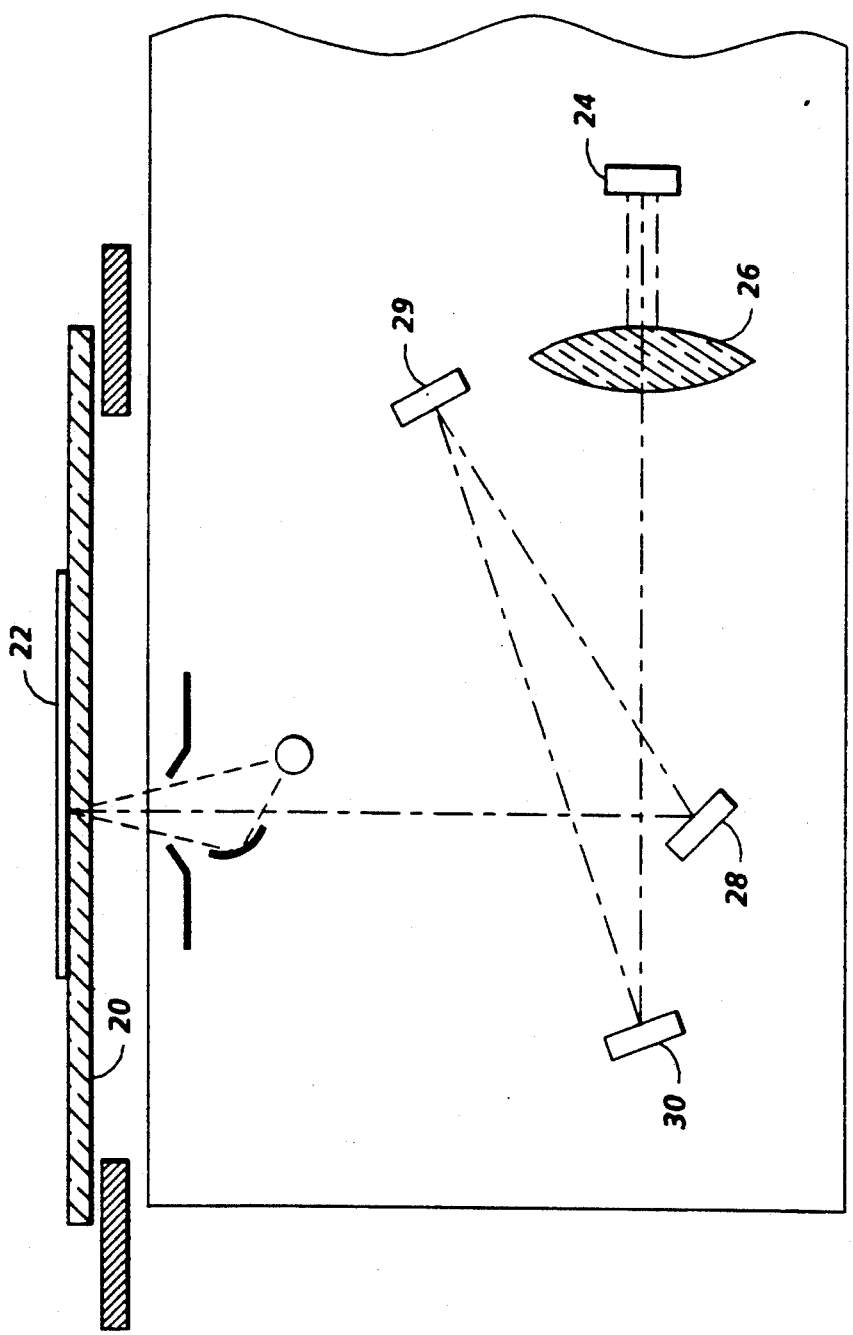
FIG. 4 is a schematic view showing certain construction details of the document scanner for the printing system shown in FIG. 1.

Referring particularly to FIGS. 2-4, scanner section 6 incorporates a transparent platen 20 on which the document 22 to be scanned is located. One or more linear arrays 24 are supported for reciprocating scanning movement below platen 20. Lens 26 and mirrors 28, 29, 30 cooperate to focus array 24 on a line-like segment of platen 20 and the document being scanned thereon. Array 24 provides image signals or pixels representative of the image scanned which after suitable processing by processor 25, are output to controller section 7. For an alternate source of images for printing, documents in a page description language such as Xerox Interpress or Adobe Postscript, can be sent from an external source, such as, for example, a publishing workstation, via a network connection, to image manipulation section 58, which will translate the document in a well known manner to a format suitable for printing, at controller section 7, for delivery to printer section 8.

Processor 25 converts the analog image signals output by array 24 to digital and processes the image signals as required to enable system 2 to store and handle the image data in the form required to carry out the job programmed. Processor 25 also provides enhancements and changes to the image signals such as filtering, thresholding, screening, cropping reduction/enlarging, etc. Following any changes and adjustments in the job program, the document must be rescanned.

Documents 22 to be scanned may be located on platen 20 for scanning by automatic document handler (ADH) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and for purposes of explanation is separated into a Raster Output Scanner (ROS) section 87, Print Module Section 95, Paper Supply section 107, and Finisher 120. ROS 95 has a laser 91, the beam of which is split into two imaging beams 94. The laster beam is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by charging devices 102 at a charging station preparatory to exposure by imaging beams 94. The latent electrostatic images are developed by developer 104 and transferred at transfer station 106 to a print media 108 delivered by Paper Supply section 107. Media 108 may comprise any of a variety of sheet sizes, types, and colors. For transfer, the print media is brought forward in timed registration with the developed image on photoreceptor 98 from either a main paper tray 110 or from auxiliary paper trays 112, or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Referring to FIGS. 1, 2 and 5, controller section 7 is, for explanation purposes, divided into an image input controller 50, User Interface (UI) 52, system controller 54, main memory disk 56, image manipulation section 58, and image output controller 60.

The scanned image data input from processor 25 of scanner section 6 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touch sensitive screen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse. A similar user interface is described in U.S. Pat. No. 4,267,443, issued May 12, 1981 to Carroll et al., the relevant portions thereof being hereby incorporated by reference into the present application. Generally, operation and control information is stored in system memory and accessed by the system controller when necessary. The system controller regulates the operation of the machine based on user programming of desired features, and the system status, as determined by conventional switches and sensors. The features within the machine are then regulated through the control of individual electrical and electromechanical devices, such as conventional servomotors, solenoids, etc.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc are carried out. Following processing, the data may be returned to main memory 56, sent to UI 52 for display on touchscreen 62, or sent to image output controller 60.

Image data output to image output controller 60 is decompressed and readied for printing by image generating processors 86 of PWBs 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Referring particularly to FIGS. 5A-5C, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52, and streaming tape controller 81 which controls and receives information from streaming tape drive 53; PWBs 70-3, 70-4, 70-5 having disk drive controller/processors 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processor PWB 70-9 having dispatch processors 88, 89 for controlling transmission of data to and from printer section 8; and boot control-arbitration-scheduler PWB 70-10.

Referring particularly to FIG. 6, system control signals are distributed via a plurality of printed wiring boards (PWBs). These include EDN core PWB 130, Making Imaging core PWB 132, Paper Handling core PWB 134, and Finisher Binder core PWB 136 together with various Input/Output (I/O) PWBs 138. A system bus 140 couples the core PWBs 130, 132, 134, 136 with each other and with controller section 7 while local buses 142 serve to couple the I/O PWBs 138 with each other and with their associated core PWB.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVM memory types are resident at various locations within system 2.

Referring again to FIG. 1, 2, and 7, user interface 52 is comprised of U/I housing 200, touch sensitive display 62, touch sensor 202, and keyboard 64. Signals from touch sensor 202 are interpreted with respect to the current programming screen. Subsequently user selections are displayed on CRT display 62 and the appropriate machine subsystems are enabled, disabled or adjusted accordingly.

With reference to FIG. 2, fonts are stored in the system on main memory 56, so that during page decomposition of a page description language (PDL) at image manipulation section 58, characters from fonts identified by the PDL for a document may be placed into the bitmapped image from printing.

With reference to FIG. 5B, when a new font is desired for addition to the font library, font information is applied to the device, preferably at streaming tape drive 53, although certainly, font information could be obtained from another media or a network connection. Streaming tape drive 53 is controlled by tape drive controller 81, which receives font information from a tape, and stores it to shared local RAM 83 on PWB 70-2, which acts as a buffer for the font information received, prior to storage determinations that will be explained hereinafter.

With reference to FIG. 7, font information for each character in the font may include several parameters required when the font information is called by the PDL for use in a document. Accordingly, font information may include, generally, the file structure of FIG. 7, which includes, in addition to a bitmap of the character (at 210), a typeface family 212 (of course, encoded values may used in place of alphanumerics); font identification 214 in terms of typeface, size and orientation; character set 216, a description of a group of characters which form a cohesive unit, such as the example, latin alphabet; and finally, the individual character code 218 in a character set which, for the PDL, represents an uppercase "A" no matter what font the character is in. These values are detectable, and comparisons may be set up between these values and reference values. It will no doubt be appreciated that if the font is a contour font, less information may be available, since usually only a single contour font is required for a typeface, but the principle remains the same with respect to the contour font identification of characters.

In accordance with FIGs. 8A-F, a series of selection screens are provided that display font information and the process of selection for storage selection in a simplified manner on the display screen 62 at user interface 52, which allows operator selection of font information to be stored to main memory 56. Selection is driven from a series of menus based on a program stored in main memory 56, which first, read the tape information to a buffer storage, and then, allow selection of contents at several levels of choice, for "long term" storage into main memory 56.

At FIG. 8A, the tape is read into buffer storage, and upon activation of the font selection program by selecting tape drive icon 500, the typefaces available on the tape are displayed in a window 502, each typeface displayed in a tabular manner, and selectable as an individual item on the display. For example, typefaces 1 Modern Bold Italic (504), 2 Modern Bold Condensed (506), and 5 Modern Light Condensed (508), are all selectable, individually. An option, represented by the selectable button Load Tape (510) is available to store the entire tape to main memory 56.

At FIG. 8B, selection of one typefaces 1 Modern Bold Italic (504), 2 Modern Bold Condensed (506), and 5 Modern Light Condensed (508), produces a pull down menu 512, similar to that shown with respect to 5 Modern Light Condensed (508), which provides selectable options to load the individual typeface (514), or to view the fonts which comprise the typeface. (516).

At FIG. 8C, selection from the typeface pull down menu of option 516, to view the fonts comprising one of the typefaces on the tape, produces a similar window, font window 518, in which each font of the typeface is identified, for example, the fonts comprising 5 Modern Light Condensed (508) including 4 point Inverse Portrait (520), 6 point Portrait (522), 8 point Landscape (524), etc. At FIG. 8D, selection of one font 6 Portrait (522) produces a pull down menu 526 that provides selectable options to load the individual font, or view the characters sets.

At FIG. 8E, a selection screen is shown, respectively showing character set window 529 for selection of character sets (such as latin character set 530, graphics character set 532, and hebrew character set 534); and at FIG. 8F, a character window 540 for selection of individual characters of, for example the latin character set a, b, c, . . . are shown. In the described embodiment of FIG. 8E, selection of a character set option provides selectable options to load the individual character set, or view the characters forming the character set (producing window 540 of FIG. 8F) each of which are selectable for inclusion or exclusion, in accordance with the construction of a filter which will be described further.

As heretofore shown, selection of fonts is based on certain groupings, with the assumption that only one group of the grouping will be loaded. Further, it has also been assumed that down to the individual character set, only those characters from a single typeface, font and character set will be loaded. This is, of course, not required. Alternative selection menus may be provided allowing selection of similar character sets from among all of the fonts of a tape, or all the portrait fonts, from among all the typefaces on single tape, or even groups of specified characters, from among all the fonts on a single tape.

In accordance with the invention, and with reference to FIG. 9, at low speed input/output processor 600, a comparison operation is performed at font comparator 602 between values obtained from the user interface 52 (selected for storage as in the descriptions of FIGS. 8A-F) and information passed thereto from tape drive 53, via RAM 83. The parameters stored are compared with individual character information, and, are stored in accordance with the determination made at the user interface. Thus, for example, if at the user interface, the parameters for the character A shown in FIG. 7 are in the filter, the "A" will stored in main memory 56. This comparison may be made at different levels, e.g., the entire character set "Latin Alphabet" may be included or only the characters "A", "B", and "C", by comparison to the character codes "101", "102", "103".

It will no doubt be appreciated that numerous changes and modifications are likely to occur to those skilled in the art, and it is intended in the appended claims to cover all those changes and modifications which fall within the spirit and scope of the present invention.

I claim:

1. In a print controller for a printer, including an arrangement to print characters in documents transmitted to the controller designated for printing in selected fonts, the selected fonts stored for future use in a device memory, including:
    said device memory including font storage means for storing the selected fonts therein, the selected fonts accessible at the font storage means when required for printing characters designated for printing in the selected fonts;
    external font receipt means, for receiving sets of font information for storage in said font storage means, from a source external to the printer;
    font designation means for designating selected subsets of font information from said font information for storage in said font storage means for future use; and
    font comparison means for comparing said selected font information with font information received from said external font receipt means, and forwarding to said font storage means only such selected subsets of font information as are designated at said font designation means.

2. The device as defined in claim 1, wherein said font information includes at least one detectable parameter describing the font information.

3. The device as defined in claim 2, wherein said font designation means designates parameters of font information to be stored.

4. The device as defined in claim 2, wherein said font designation means designates parameters of font information not to be stored.

5. The device as defined in claim 1, wherein said font information includes at least one detectable parameter describing the identify of a character in the font information.

6. The device as defined in claim 5, wherein said font designation means designates characters in the font information to be stored.

7. The device as defined in claim 5, wherein said font designation means designates characters in the font information not to be stored.

8. In a printer, including an arrangement to print characters in documents transmitted thereto in selected fonts, the selected fonts stored and storable for use in a font storage memory with individual members of a set thereof forming said selected fonts accessible when required for printing characters designated for printing in said selected fonts; external font receipt means, for receiving font information including selected fonts from a source external to the printer; said font information identifying parameters characterizing said font and characters therein; and font filter means for filtering from said font information for storage at said font storage means, said font filter means including:
    designating means identifying parameters of font information for storage;
    font comparison means for comparing said font information received from said external font receipt means with identified parameters of font information for storage; and
    means for storing in the font storage memory only font information representing a subset of the font member set identified for storage by said font comparison means.

* * * * *